Patented June 15, 1943

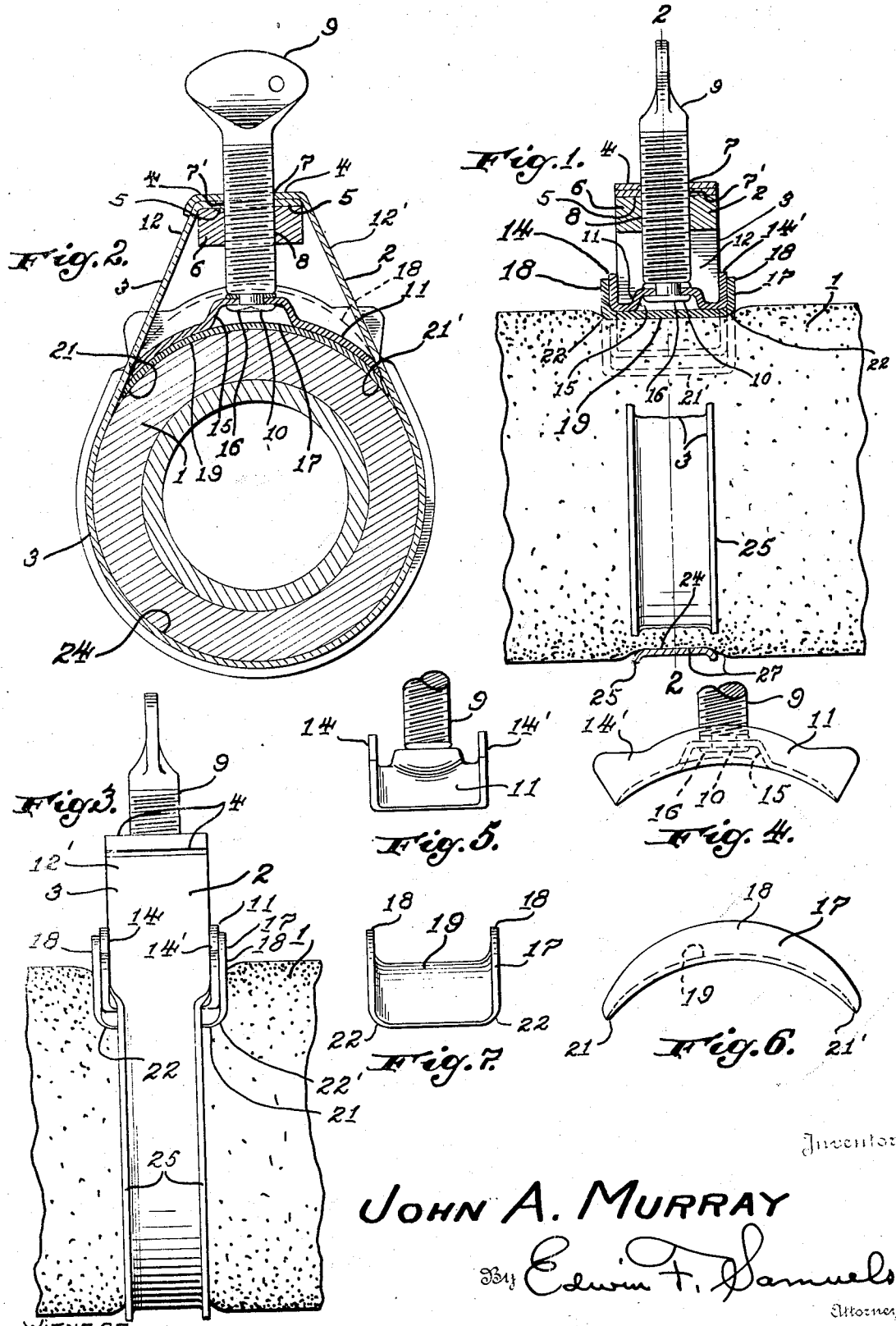

2,321,930

UNITED STATES PATENT OFFICE 2,321,930

HOSE CLAMP

John A. Murray, Baltimore County, Md., assignor to Murray Corporation, a corporation of Maryland Application May 27, 1942, Serial No. 444,627

7 Claims. (Cl. 24—19)

The invention relates to a hose clamp used in connecting a rubber or similar hose to a fitting or nipple as in the fuel line of the motor of an airplane or in the fuel line or in the water line of the cooling system of the motor of a motor vehicle or other internal combustion engine and for other purposes.

In airplanes used for military purposes and to a less extent in motor vehicles for similar purposes, and in other instances to some extent, a self-healing or bullet proof hose is employed, such hose is made of relatively soft rubber which tends to close or heal leaks or punctures as in case of puncture by the passage of a bullet or of a projectile. This healing is sometimes assisted in the manufacture of the hose by placing the material under initial stress which provides a tendency to displacement closing leaks and punctures in this way.

Such hose is relatively soft and easily injured, the excessive vibration incident to airplane operation being an important factor.

The hose clamp of the invention is designed and constructed with particular reference to this type of soft self healing hose though it may be otherwise used, the tendency to chafing and injury to the hose by the clamp which is a difficulty previously encountered being to a large extent reduced or overcome.

Two points or locations in such installations where this injury has most frequently occurred in the past are first, at the edges of the band which encircles the hose the clamping being in fact accomplished by tightening of this band, and second, at the end of the radial screw by which tightening is effected.

In order to overcome these difficulties the longitudinal edges of the band where they come into contact with the hose have in accordance with present invention been provided with an outwardly disposed flange which is turned backwardly or outwardly from the band in a radial direction relatively to the hose. This flange extends along the entire hose contacting portion of the band providing a smooth curved contacting surface in place of the cutting edge which was formerly presented to the hose.

A further improvement which may be used with or without this particular form of band resides in the provision of a bridge or bridge plate to which the tightening or tension screw is swiveled at its inner end, adjacent the hose, the bridge or plate being concaved toward the hose and concentrically with the screw or swivel; and to further protect the hose from creasing and swelling at the concavity, the concave portion is covered and the hose is protected by an inner cover plate which underlies the bridge preferably extending from one end to the other of the bridge contacting the band at both ends and further contacting the bridge at its opposite outer ends and inwardly from each end to the concavity which is spanned by the cover plate.

In the accompanying drawing I have illustrated a hose clamp for bullet proof and similar proof hose, embodying the features of the invention in the preferred form.

In the drawing,

Figure 1 is a side elevation of a fragment of hose showing the clamp of the invention affixed thereto in operative relation, the hose clamp being broken away as to its upper portion on a vertical plane of the hose axis and showing the tightening screw in elevation and the surrounding parts of the hose clamp in section.

Figure 2 is a section taken on a plane transverse to the hose axis which plane also includes the axis of the tightening screw, being indicated by line 2—2 in Figure 1.

Figure 3 is a side elevation of a fragment of the hose and clamp showing the latter in its operative or clamped position.

Figure 4 is a side elevation of the bridge removed.

Figure 5 is an end elevation of the same.

Figure 6 is a side elevation of the cover plate removed.

Figure 7 is an end elevation of said cover plate.

Referring to the drawing by numerals each of which is used to indicate the same or similar parts in the different figures, Figures 1, 2 and 3 illustrate a hose 1 which may be of the self healing or bullet proof type, to which the hose clamp 2 of the invention is applied.

The hose clamp 2 as shown comprises a flexible band 3 which is most conveniently of metal. This band encircles the hose at the clamping area being preferably in a single piece and secured at its ends 4 and 5 to a tightening nut 6.

In the preferred form shown the ends 4 and 5 or end portions may be secured to each other and to the nut in any suitable manner as by spot welding, said ends being apertured in registration at 7, in alignment with the threaded opening 8 in the nut, the holes 7 and 7' being of a size corresponding to a size of the threaded opening 8 in the nut.

The tightening screw 9 in the arrangement shown is at the top center having its axis in the vertical plane of the hose axis, it being however apparent that the clamp and the tightening screw may be turned through any desired angle about the hose. The thickness of band 3 has been exaggerated for convenience in drawing.

The screw 9 has a threaded engagement with the hole 8 or threaded opening 8 in the nut 6 and at its lower end it has a swiveled connection at 10 with the plate like bridge member 11.

In the form and arrangement shown the nut 6 is spaced upwardly from the bridge 11 and the end portions of the band are correspondingly deflected outwardly at the ends of the bridge at 12 and 12' and are correspondingly deflected from the circumference of the hose extending therefrom in tangential directions toward the top of the nut 6. These deflected portions 12 and 12' as they leave the circumference of the hose pass closely adjacent to or engage the ends of the bridge 11, which is of a width corresponding to the width of the band 3. As shown the bridge 11 is provided with side flanges 14 and 14' extending from one end of the bridge to the other with suitable spacing to cause them to contact or lie closely adjacent to the side edges of the band 3 as best shown in Figure 1 and also in Figure 3.

The center of the bridge instead of being plain cylindrical in the form of the invention shown is concave inwardly from the circumference of the hose, the concavity being indicated at 15 and the head 16 of the swivel 10 is in said concavity, being spaced well upwardly from the normally cylindrical surface of the hose.

In order to protect the hose which tends to bulge or swell upwardly into the concavity 15 the bridge 11 is provided in the form of the invention shown, with a cover plate 17 shaped longitudinally to the contour of the cross-section of the hose, i. e., on the arc of a circle or cylinder and it is provided with radial side flanges 18 extending in the direction of the circumference of the hose and overlying on the outside, the flanges 14 and 14' on the bridge; and the center of the cover plate at 19 being approximately cylindrical, covers or bridges the concavity 15 and protects the hose from swelling and injury at this point and from other causes.

It may be noted that the ends of the cover plate 17 indicated at 21 extend in the form shown beyond the bridge 11 into contact with the band 3 near the point where it leaves the surface of the hose 1, extending at 12 and 12' directly toward the top of the nut 6. The cover plate 17 is shown in side elevation in Figure 6 and in end elevation in Figure 7 being in these figures removed or separated from the hose clamp.

The cover plate 17 may to advantage be attached to the bridge in the operative position, shown in Figures 1, 2 and 3, by spot welding or in any suitable manner thus preventing displacement and loss of the same when the clamp is opened or released. When thus attached it remains connected by the swivel 10 to the lower end of the tightening screw 9.

The cover plate is of particular importance in the protection it affords against distortion, weakening and cutting of the extremely soft self healing or bullet proof hose used for the purposes already set forth. It may be noted in this connection that the edges or corners of the cover plate 17 indicated at 22 in Figure 7 are rounded to give the maximum of protection at this point and it is further of importance that the center of the cover plate at 19 covers and excludes the rubber of the hose from entering into the concavity of the bridge.

It also assures or provides a smooth uniform bearing on the complete circumference of the hose and prevents a possible contact between the rubber hose and the extremity of the tightening screw avoiding a difficulty previously encountered, namely injury to the hose by contact with the end of the screw.

For the same general purpose, i. e., in order that the hose particularly the soft type, referred to may be protected, particularly under conditions of excessive vibration, from cutting and injury by the clamp, the portion of the necessarily thin flexible band 3 which contacts the hose as indicated at 24, extending around the hose from one end of the bridge 11 to the other, and comprising in the form shown an arc of approximately 270°, is provided with flanges 25 extending along each edge of the band and turned outwardly in radial planes of the hose. It may be noted that under the conditions set forth the band 3 would necessarily be drawn into the body of the hose forming a channel 27 therein when the screw 9 is tightened, and this edge flange which may be of a width corresponding to the depth of this channel or of any suitable width, prevents the otherwise thin edges of the flexible band 3 from cutting into the hose and greatly reduces and practically eliminates all injury to the hose resulting from this source.

The manner of applying the clamp is well understood and need not be discussed, the operation of the invention being fully set forth in connection with the description.

I have thus described a hose clamp embodying the features of the invention, the description being specific and in detail in order that the manner of constructing, applying, operating and using the invention may be fully understood, however, the specific terms herein are used descriptively rather than in a limiting sense the scope of the invention being defined in the claims.

What I claim as new and desire to secure by Letters Patent is:

1. A hose clamp of the type having a flexible tension band adapted to encircle the hose and a tightening nut secured to the ends of the band, a bridge and a screw threaded through the nut and having a thrust engagement with the center of the bridge, the bridge being concave towards the hose and around the end of the screw, a cover plate underlying the bridge between the bridge and the hose and bridging the concavity.

2. A hose clamp of the type having a flexible tension band adapted to encircle the hose and a tightening nut secured to the ends of the band, a bridge and a screw threaded through the nut and having a thrust engagement with the bridge, the bridge being concave towards the hose and around the end of the screw, a cover plate underlying the bridge between the bridge and the hose and bridging the concavity, said cover plate having upturned edges parallel to the length of the band.

3. A hose clamp having a flexible tension band adapted to encircle the hose and a tightening nut secured to the ends of the band, a bridge and a screw threaded through the nut and having a swiveled engagement with the bridge and a cover plate underlying the bridge between the bridge and the hose and protecting the hose from contact with the swivel, the cover plate having its edges parallel to the band provided with flanges turned outwardly from the hose and extending along the same parallel to the band and engaging the corresponding edges of the bridge.

4. A hose clamp having a flexible tension band adapted to encircle the hose and a tightening nut secured to the ends of the band, a bridge and a screw threaded through the nut and having a swiveled engagement with the bridge and a cover plate underlying the bridge between the bridge and the hose and protecting the hose from contact with the swivel, the cover plate having its edges parallel to the band provided with flanges turned outwardly from the hose and extending along the same parallel to the band and engaging the corresponding edges of the bridge, the bridge having edge flanges closely adjacent the edges of the band.

5. A hose clamp for a soft, self healing hose, said clamp having a continuous tension band partially encircling the hose along an arc in excess of 180° the opposite end portions of the band being tangent to the circumference of the hose at the ends of said arc and converging toward a nut to which they are secured, a cover plate overlying the hose and extending from one tangent point to the other completing the encirclement of the hose, a bridge overlying the cover plate and having a raised portion at the center of the cover plate which is concave toward the latter, and a screw having a swivel and thrust engagement with said raised portion and being threaded through said nut to apply tension to said band.

6. A hose clamp as per claim 5 in which the cover plate is provided with upturned edge portions parallel to the length of the band, and extending along the opposite edges of the same.

7. A hose clamp as per claim 5 in which the cover plate is provided with upturned edge portions parallel to the band and the bridge plate is seated between and positioned by said edge portions which extend along the opposite edges of the band.

JOHN A. MURRAY.